J. & A. DEY.
TIME REGISTERING CLOCK.
APPLICATION FILED OCT. 7, 1902.
908,971.
Patented Jan. 5, 1909.
5 SHEETS—SHEET 1.
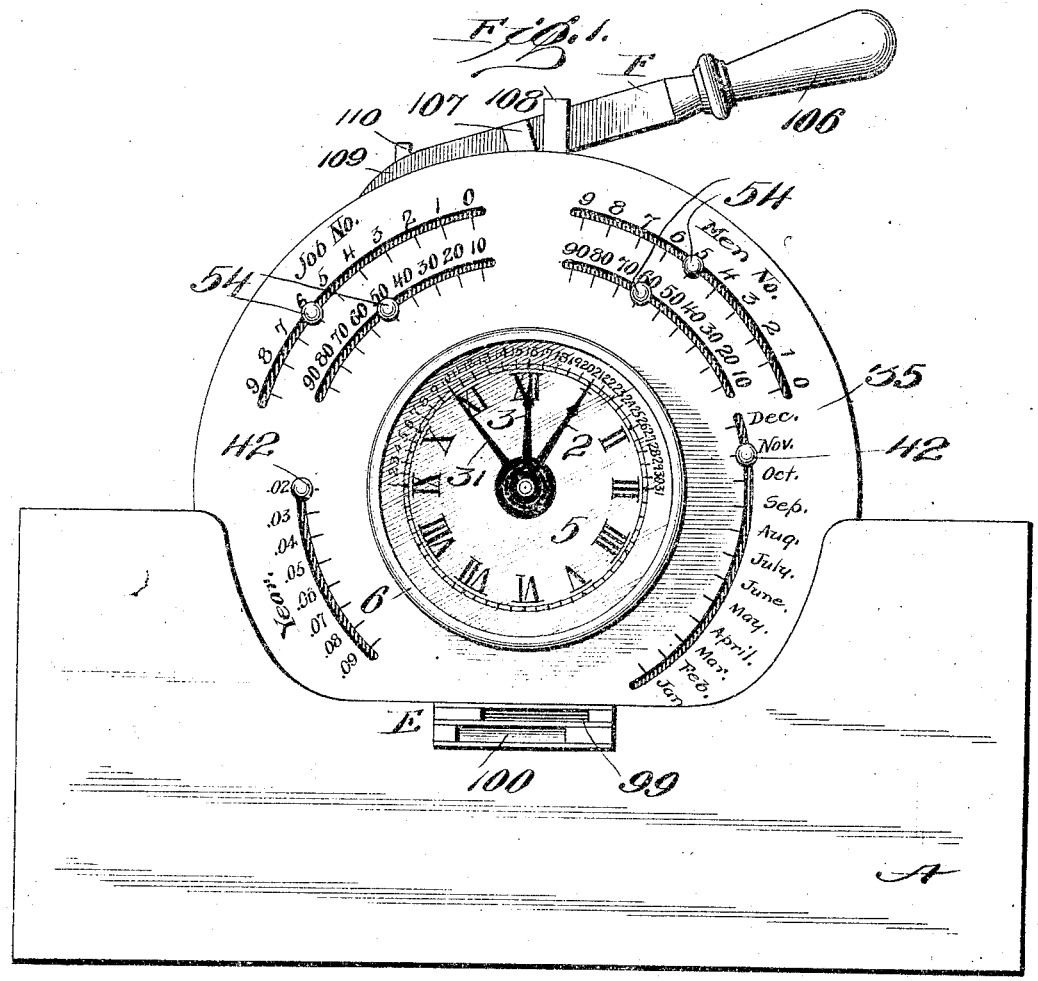
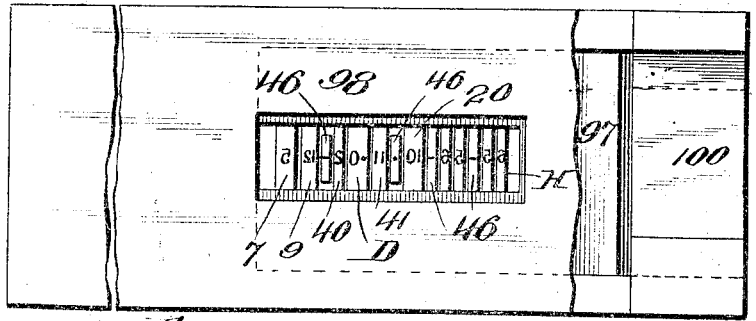
WITNESSES:
Allan Foose.
H. M. Seamans.
INVENTORS
John Dey
Alexander Dey
BY
Duell, McGrath & Warfield
ATTORNEYS.

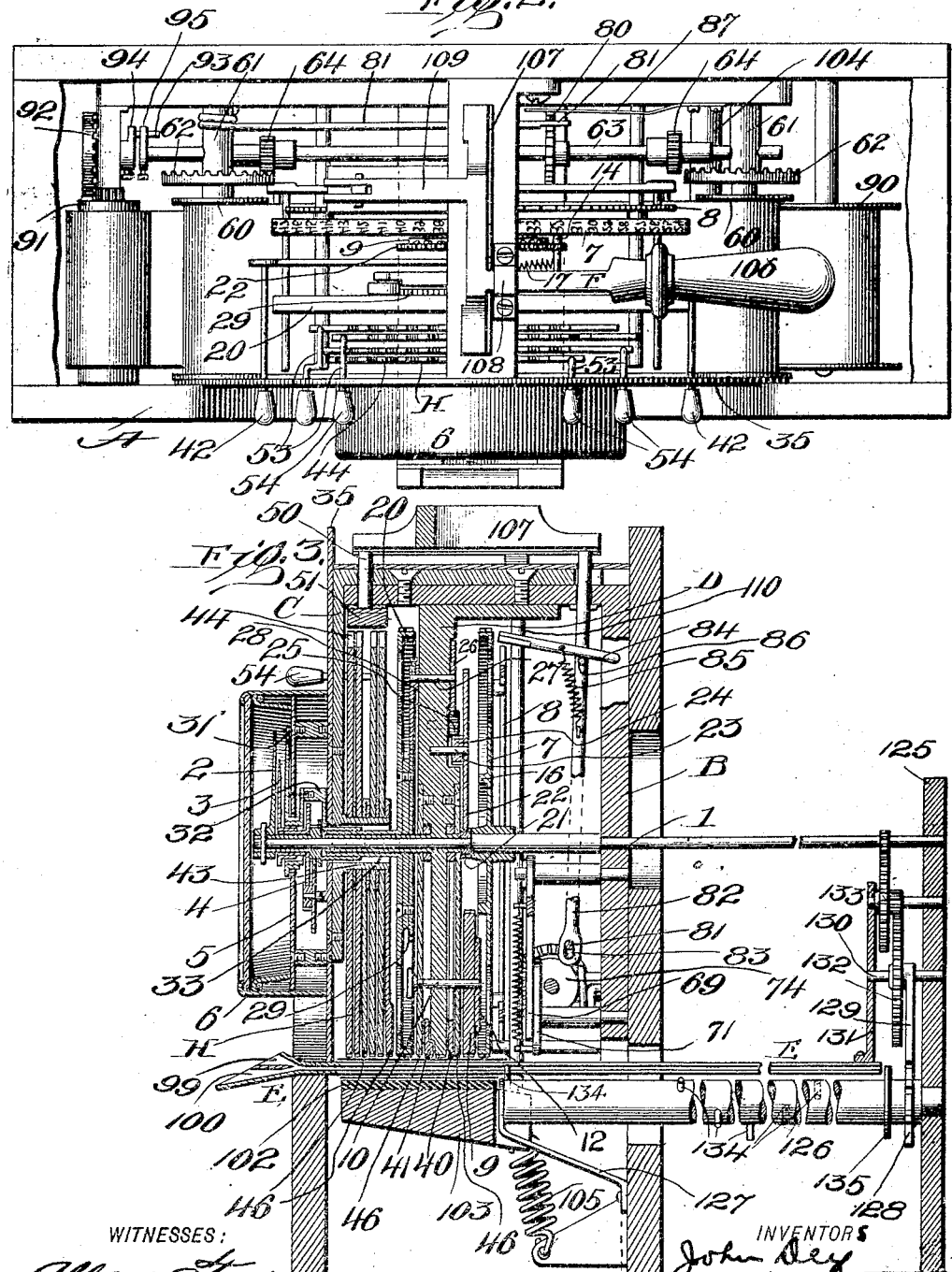

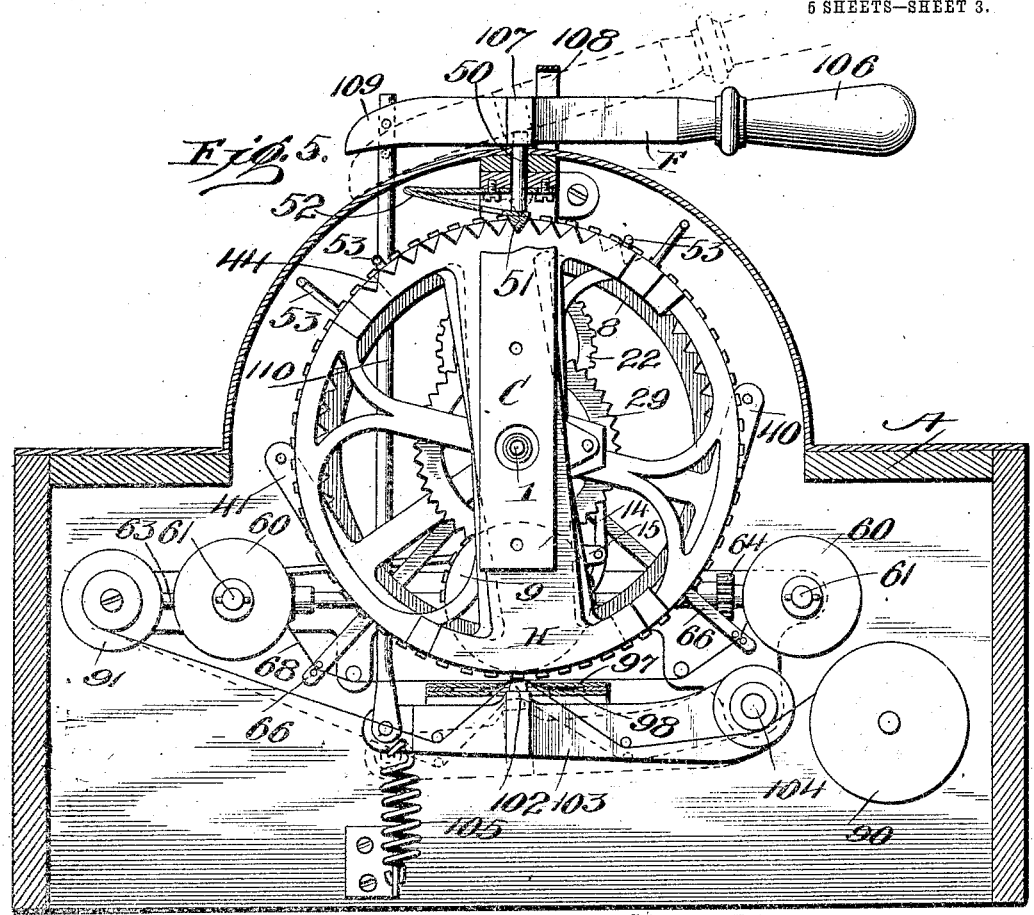

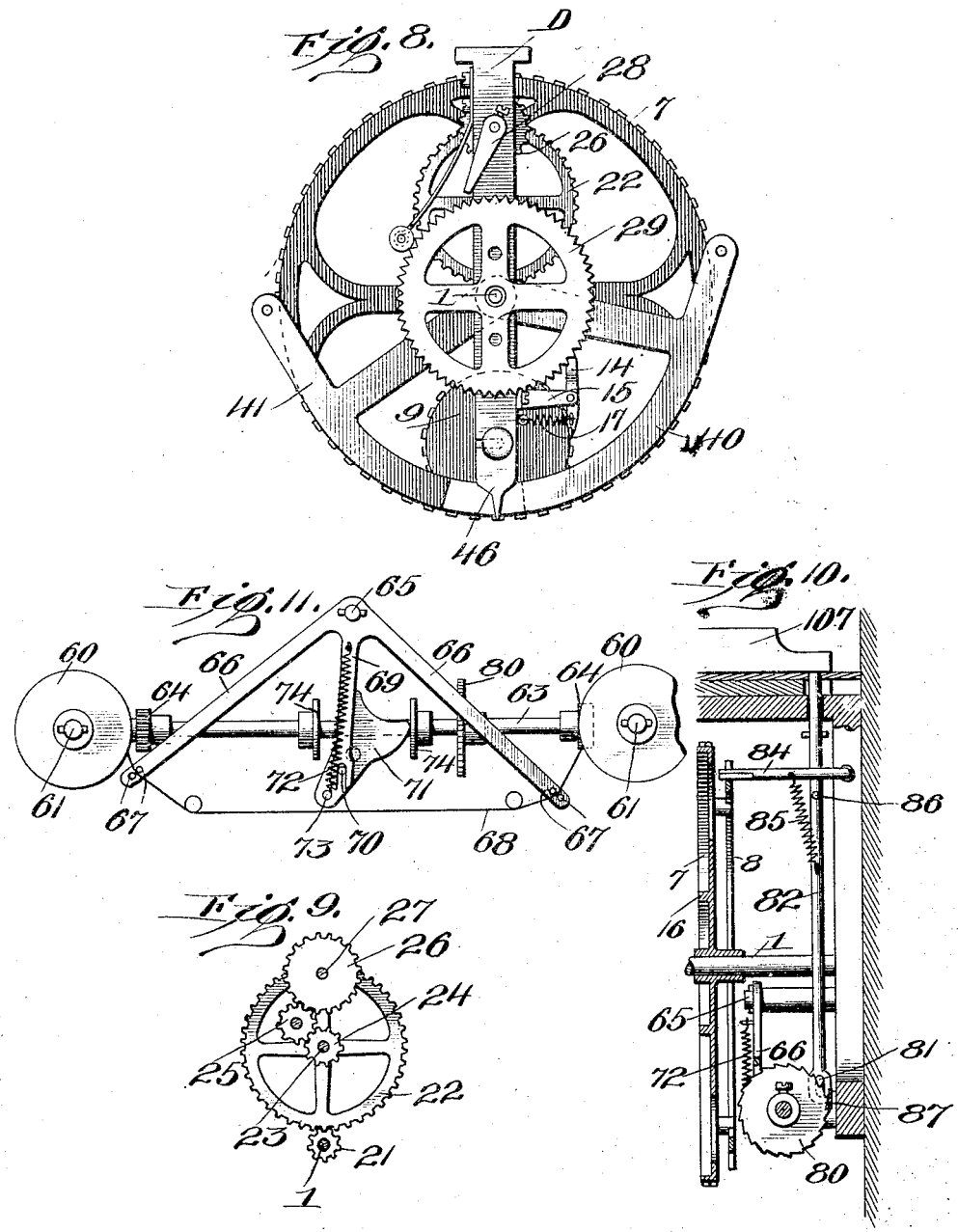
J. & A. DEY.
TIME REGISTERING CLOCK.
APPLICATION FILED OCT. 7, 1902.
908,971.
Patented Jan. 5, 1909.
5 SHEETS—SHEET 4.

J. & A. DEY.
TIME REGISTERING CLOCK.
APPLICATION FILED OCT. 7, 1902.
908,971.
Patented Jan. 5, 1909.
5 SHEETS—SHEET 5.
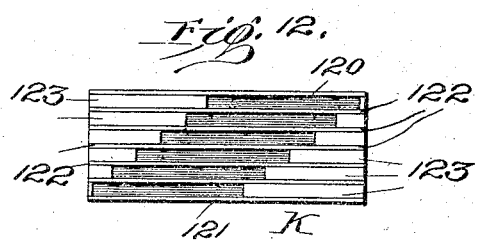
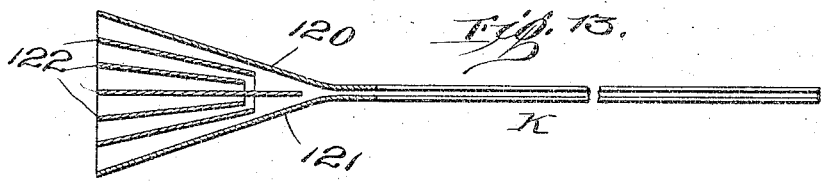
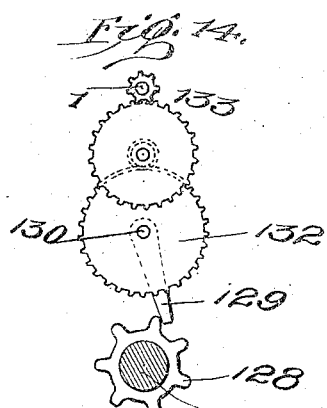
WITNESSES:
Allan Fowle
H. M. Seamans
INVENTORS
John Dey
Alexander Dey
BY
Duell, McGrath & Wakeman
ATTORNEYS

UNITED STATES PATENT OFFICE.

JOHN DEY, OF SYRACUSE, NEW YORK, AND ALEXANDER DEY, OF GLASGOW, SCOTLAND, ASSIGNORS TO DEY TIME REGISTER COMPANY, OF SYRACUSE, NEW YORK, A CORPORATION OF NEW YORK.

TIME-REGISTERING CLOCK.

No. 908,971.      Specification of Letters Patent.      Patented Jan. 5, 1909.

Application filed October 7, 1902. Serial No. 126,298.

*To all whom it may concern:*

Be it known that we, JOHN DEY, residing at Syracuse, in the county of Onondaga and State of New York, and ALEXANDER DEY, residing at Glasgow, in the county of Lanark, Scotland, have invented certain new and useful Improvements in Time-Registering Clocks, of which the following is a full, clear, and exact description, such as will enable others skilled in the art to which it appertains to make and use the same.

This invention relates to a time-registering clock or a mechanism for use in a factory to record the time of employees. It is also adapted to be used as a job cost-keeping clock to record the time which each workman puts on any particular job so that the employer may know exactly the labor put on such job and be able to determine that part of the cost.

Various features of the invention, also, are capable of use in a variety of other relations.

The invention consists in the features of construction, arrangement of parts and combinations of elements, a specific embodiment of which will be hereinafter fully set forth and the novel features thereof pointed out in the claims at the end of this specification.

In the accompanying drawings, Figure 1 is a face view of my improved cost-keeping clock. Fig. 2 is a top plan with a portion of the casing removed and with the bracket and certain mechanism at the rear removed. Fig. 3 is a transverse vertical section showing the interior mechanism. Fig. 4 is a bottom plan view of the card-holder, with parts broken away, and showing the position of the impression surfaces with relation thereto. Fig. 5 is a view partly in section and partly in side elevation showing a part of the interior mechanism. Figs. 6 and 7 are details in side elevation of the minute type-wheel, showing the connections to the hour-wheel. Figs. 8 to 11, inclusive, are details of various portions of the mechanism. Fig. 12 is a face view of a modified form of card holder or guide. Fig. 13 is a longitudinal vertical section of the same. Fig. 14 is a detail of the controlling mechanism for the card banking device, or device by which the distance to which the card may be inserted in the holder may be predetermined.

Similar reference characters refer to similar parts throughout the several views.

A suitable casing A is provided which may be of any desired construction, and within said casing are braces or supports B, C and D which are illustrated merely as a convenient framework for the structure.

A minute-hand spindle 1, adapted to be actuated by any suitable clock mechanism, (not shown) is journaled in the framework and carries the minute and hour hands 2 and 3, the former pinned thereto and the other driven therefrom by a suitable train of reduction gearing designated in a general way by 4. These hands traverse a clock face 5 which may conveniently be provided with an inclosing cover 6. Carried by the minute-hand spindle so as to rotate therewith is a minute type-wheel 7 which may, if desired, be connected to the minute-hand spindle so as to allow for a certain amount of lost motion in printing. A notched wheel 8 is secured to the minute-wheel and acts in connection with a suitable detent, hereinafter described, to hold the type-wheel rigid at the moment of printing.

The hour-wheel 9 having type from 1 to 24 is carried upon a suitable spindle 10 journaled in the lower end of the frame-member D and it is rotated from the minute-wheel by the means best shown in Figs. 6 and 7. In these views the position of the hour-wheel is indicated by dotted lines, and carried with the hour-wheel is a ratchet 12 of 24 teeth with which a tongue 13 carried by the minute-wheel engages once during each revolution of said wheel, thereby turning the hour-wheel through one space. The hour-wheel is normally prevented from turning and likewise braked to prevent overrunning, by means of the braking lever 14 pivotally mounted upon a bracket 15 secured to the framework and normally held to contact with the ratchet 12 by means of the ring 16 upon the type-wheel 7, with which the upwardly projecting arm of lever 14 contacts. This ring is cut away at one portion of its periphery, as shown, in order to allow the upper end of the lever 14 to move inwardly at that point and relieve the ratchet-wheel of the pressure at its other end. A spring 17 tends to draw the lower end of the lever 14 at all times against the ratchet wheel and thus when the positive pressure of the lever upon the ratchet is relieved by means of the upper end of the lever coming against the broken-away or mutilated part of the ring 16, the lever will be held against the ratchet with a yielding pressure not sufficient to prevent motion of the ratchet and hour-wheel when struck by the tongue 13, but sufficient to prevent overrunning of the ratchet, or its rotation beyond the desired amount, as will be readily understood. These type-wheels, as well as the other printing surfaces, are all set so that the line of impression will be suitably arranged with reference to the device for receiving the card or the blank to be operated upon, as will be further set forth.

A wheel 20, which is provided with suitable type from 1 to 31 in order that it may print the days of the month, is loosely carried upon a sleeve projecting from the frame-member D so that it is concentric with minute-spindle 1 and it is driven from said minute-spindle, as best shown in Figs. 8 and 9, by a train of gearing which includes a pinion 21 carried with the minute-spindle 1, a wheel 22 meshing therewith and supported upon a stud-shaft 23 projecting from the frame, a second pinion 24 upon said stud-shaft, idler 25, a wheel 26 upon a short spindle 27 passing through the frame-member D, and a tongue or striker 28 secured to the other end of this spindle preferably by means of a set-screw as shown, so that it may be adjustable, and contacting at proper times with a ratchet 29 rigid with the day-wheel 20.

It will be understood that the above-described train of gearing must be so proportioned that the day-wheel will be moved one space once in twenty-four hours, the shifting preferably taking place at midnight. In order to do this the pinion on the minute-spindle is conveniently of twelve teeth, the gear-wheel 96 teeth, the pinion on this wheel 15 teeth, and next gear-wheel 45 teeth. Inasmuch as this day-wheel is inclosed by the casing it is convenient to have an outside indicator to show its movement and this is provided for as shown by the pointer 31 which travels in connection with index figures arranged about the clock face as shown in Fig. 1. This pointer is connected to the day-wheel 20 by means of the arched connecting member 32 connected at one side to the hub of the pointer and at the other side to sleeve or hub 33 projecting from the day-wheel. This construction of arched connecting member is necessary in order to avoid contact with the train of gearing for actuating the hour-hand.

A dial face 35, as in Fig. 1, is provided with various slots having indicator figures in connection therewith for "Job No.," "Men No.," the year and the month. Corresponding type-wheels provide for registering upon a suitable impression surface the number of the workman, the number of the job upon which he is working and the exact date, the day, the month, the year, the hour and minute when each man starts on the job and the same when each man leaves it.

As already described, the day, hour and minute-wheels are actuated automatically from the clock-mechanism and the type-wheels which supply the remaining data, which may be called the recording type-wheels, are provided for as follows: Segmental type-wheels 40 and 41 shown in Figs. 5 and 8 and in section in Fig. 3 are provided with the proper numerals to indicate the number of the month and year, and are pivotally mounted so as to swing concentrically with the minute-spindle in proper relation to the other segmental type-wheels. From the end of each of these type-wheels there projects a handle which passes through the proper slot in the dial face and terminates each in a knob 42, which knob is preferably screwed onto the end of the projecting handle or rod so that the dial face may be removed upon removing the knob and also that the type-wheels may be held in proper position by screwing up the knob so that there will be firm frictional contact between the knob and the dial face. The recording wheels for the "Men No." and "Job No." are mounted upon a boss or hub 43 projecting from the side frame-member C. They are thus concentric with the minute-wheel spindle but independent thereof. These type-wheels, designated generally by H and having two in each set, are of spider construction with portions of their periphery cut away where not needed and provided with the necessary type on the lower portion of their periphery and on the upper portion with notched teeth 44, the positions of which correspond with the positions of the type and are adapted to be engaged by a wedge-shaped alining detent, as hereinafter described. The exact construction of these recording type-wheels is immaterial. Many constructions thereof and forms of mounting will be readily suggested which will answer the same purpose as the forms shown.

At suitable points between the type-wheels already described are placed fixed type, as is shown in Fig. 4, which provide the necessary dashes for separating the various sets of data, and the periods where periods are necessary. The lower end of frame-member D is conveniently utilized to supply a printing surface carrying a period and the cipher which is used in conjunction with the numeral upon the type segment 41 to print the year. The other of these fixed type are carried at the lower ends of arms suitably fastened to the framework, one of which is shown at 46, Fig. 8. The alining detent which works in connection with the notches in type-wheels H, comprises a plunger 50 passing loosely through the framework and having a V-shaped wedge 51 at its lower end shaped to fit the notches in the upper ends of the type-wheels. This plunger is held normally raised by means of spring 52, but is adapted to be depressed against the force of said spring in order to complete the alinement of the type recording-wheels when they have been moved to any desired position by the handles 53 which project therefrom through the slots in the upper side of the dial face, as shown in Fig. 1, said handles being provided with knobs 54 similar to those before described.

The operation of the printing mechanism thus far described will be readily understood by those skilled in this art. The printing wheels are governed by the clock mechanism so that they are always in proper position. When the workman begins on a particular job he adjusts the Job No. recording wheels by means of the handles thereof to suit the job and the Men No. to suit the number assigned to him, and the type-wheels are then in position to print upon a card which may be inserted by the workman, or upon a suitable web, or both, the month and year type-wheels being positioned at suitable times as is necessary.

A ribbon mechanism is provided, as shown most clearly in Figs. 2, 5 and 11. The spools 60 therefor are loosely journaled upon pins 61 extending from the frame and driven by crown-gears 62 connected to said spools. A shaft 63 has loose sliding bearings conveniently through the pins 61 so that the shaft may be reciprocated to swing one of the spur-gears 64 thereon into contact with the crown-gear at one end of the machine, while at the same time disengaging the gear at the other end. This ribbon reverse is automatically effected by means of the construction shown in Fig. 11. A three-armed actuating lever is pivoted upon a pin 65 projecting from the frame. The two outer arms 66 of this lever carry pins 67 projecting inwardly and between which the ribbon 68 passes. A third central arm 69 of the lever is forked at its lower end to engage a pin 70 carried by a lever 71 which is loosely pivoted centrally of its length upon a pin projecting from the framework. A spring 72 is connected to a point near the upper end of the arm 69 and at its lower end to a pin 73 at the lower end of the lever 71. The relative position of the pivotal points is such that the spring 72 will hold the upper end of lever 71 on whichever side of its pivotal point it happens to be thrown. Collars 74 upon the shaft 63 are adapted to be struck by the upper end of lever 71 in order to move said shaft lengthwise to disengage one ribbon spool and engage the other. This shifting is accomplished by a pin or projection carried near the end of the ribbon striking the pins 67 when the ribbon has been unwound from the spool at either side and thereby as the tension upon the ribbon continues the reversing lever is swung about its pivot 65 and through the connection of arm 69 with the lever 71 this lever is thrown to the opposite side from that in which it previously was, and the shaft 63 is shifted, the force of its throw being accentuated by the spring 72. The rotation of shaft 63 is provided for by means of the ratchet 80 carried by said shaft and adapted to be rotated by the pawl which is formed by the end of a long spring 81, the end of which is wrapped about one of the pins 61, as shown in Fig. 2. When this rod is depressed it will carry the ratchet a given number of teeth and when pressure upon the rod is released it will return of its own resiliency into position for the next movement. This spring pawl is moved by means of the rod 82 projecting upwardly through the framework and having an elongated slot 83 in its lower end through which the spring pawl 81 passes. This rod 82 in its downward movement also carries with it a detent 84 which is connected thereto by means of a spring 85, said detent being suitably pivoted at one end to the frame and at its other end shaped to fit the notches in the notched wheel 8 carried by the minute type-wheel in order to aline and hold said type-wheel fixed during the printing operation. A pin 86 is also provided upon the rod 82, suitably positioned to engage the detent 84 upon the upward movement of the rod to insure its being withdrawn from the notched wheel. Figs. 3 and 10 show the two positions of these parts. A suitable brake may be provided for the ratchet 80, if desired, that shown being in the form of a leaf spring 87 connected at one end to the framework and having a yielding bearing at the other end upon the ratchet.

Where it is desired to make an impression upon a web of paper instead of the card usually used with these machines, or upon both the web and the card, this may be provided for as follows: A supply reel 90 is suitably journaled upon a pin at one end of the machine and the web passes from said reel beneath suitable guides and the printing surfaces to a winding reel 91. This reel is driven as shown in Fig. 2 by means of a gear which it carries engaging with a crown-wheel 92, which crown wheel is carried by a short shaft connected to the end of shaft 63 by a coupling which consists of a pin 93 carried by a disk 94 on one of the shafts passing loosely through a hole in a disk 95 carried by the other shaft so as to allow freedom of movement for the reciprocation of the ribbon-actuating shaft while at the same time driving the web shaft therefrom.

For use in cases where it is desired to print upon a card to be inserted by the workman, we provide a card-guide or holder of novel and improved construction. This holder, designated in a general way by E, is shown as in Fig. 4 as composed of upper and lower plates 97 and 98 suitably spaced apart to provide a guideway or channel for guiding and holding the card, said plates being both slotted longitudinally in order that the printing wheels may be brought into contact with the card in the holder or with the web which would normally pass below the holder, thus providing an opening through the holder from bottom to top and extending from near the front of the holder to the extreme end for a purpose to be hereinafter described.

In order to provide an arrangement by which the details printed at the finishing of a job may be properly positioned below the details printed at the beginning of the job to avoid superimposing of impressions, etc., we make the channel or guideway in this card-holder of a width substantially greater than the card which is to be inserted therein and construct the holder with a plurality of mouths, two being shown in Figs. 1 and 3 at 99 and 100. These mouths are located in different planes and not directly above each other. The effect of this spacing or staggering of the mouths will be to print the details of the job upon different lines longitudinally of the card, depending upon the mouth into which it is inserted. Such arrangement dispenses with all shifting levers of any kind, insures the proper alinement and positioning of the card, and is moreover of very simple and cheap construction as will be obvious. The number of mouths and their arrangement with reference to the channel may be varied to suit the particular requirements for which a machine is designed as will be obvious.

Provision is made for taking the impression, as shown, by means of impression member or platen 102 which is of any suitable material, preferably rubber, and carried by the lever 103 pivoted upon a pin 104 at one end and at the other end acted upon by a spring 105 connected to the framework and to the end of the lever in order to normally hold said lever of the platen in position away from the printing surfaces. The platen is operated against the force of this spring in order to carry a card which may be in position beneath the printing wheels or the web of paper or both, as shown in Fig. 5, against the type-wheels by means of the operating lever F which is designed to be actuated by the workman after he has inserted his card. This lever is provided with a handle 106 which is joined to a cross bar 107, see Fig. 2 the lower portion of this cross bar being adapted to rest upon the upper ends of the plunger 50 and of the rod 82 which actuates the ribbon mechanism. It is held loosely in position upon the top of the frame by a clip or loop 108. Projecting forwardly from the cross bar 107 is an arm 109, between the forked ends of which is the upper end of lever 110, the lower end of which is pivotally connected to the end of the platen carrying lever 103.

In Figs. 12 and 13 is shown a card holder provided with six mouths, suitably spaced or staggered so that if a card be inserted successively into these mouths, beginning from the top, the data will be printed in six successive lines underneath each other. Such an arrangement is particularly adapted for a machine which it is desired to use as a time recorder alone without printing any other data. Thus the mouths could be successively labeled "Morning in", "Morning out", "Noon in", "Noon out", "Night in", "Night out", or with such other indications as desired to indicate the arrival and departure of employees throughout the day as is common in devices of this type, and the spacing of the mouths will then insure that the time of each employee be printed on his card with the various impressions for the day in a vertical line. The construction of this holder which is designated in a general way by K is clear from the illustration in Figs. 12 and 13 and it will be obvious that it may be varied within wide limits. As shown, the upper plate 120 is bent upward at its forward end and the lower plate 121 is bent downward to form a flaring funnel. Between these two plates are inserted the requisite number of dividing plates 122, the spaces between two adjacent plates being closed by in-set strips 123 which are so arranged as to leave the openings or mouths proper, through which the card is to be inserted, in suitable staggered relation.

It will be understood that in the construction already described there is provided means by which data may be properly printed upon a card inserted in the holder beneath the printing mechanism with different sets of impressions arranged in a vertical line one beneath the other, as is advantageous in certain cases. It may also be desired under certain circumstances to have the impressions upon the card spaced longitudinally thereof as where it is desired to arrange the data according to the days of the week. As, for instance, when it is desired to merely record the entering and leaving times of employees, it is advantageous to have a vertical line of impressions for any given day and a succession of such vertical lines for the successive days of the week. This is provided for in the present construction as shown in Figs. 3 and 14 by providing a means whereby the distance to which the card may be inserted into the holder may be limited and such distance may be varied automatically from day to day. A bracket, or other suitable support, 125, is arranged in rear of the machine and on this bracket is journaled one end of a shaft 126 which projects horizontally therefrom substantially parallel with and a short distance below the card holder E. The other end of this shaft 26 is journaled in any suitable bracket as 127. On the end of this shaft next the bracket 125 is fixed a star wheel 128 of any desired number of teeth, seven being shown in the present instance. The star wheel and the shaft are rotated a distance equal to one tooth of the star wheel, once in twenty-four hours, by means of a tongue 129 loosely mounted upon a stud 130 which is supported at one end in the bracket 125 and at the other end in a brace or standard 131. This tongue is carried with a gear 132 which is driven by a suitable chain of gearing, designated in a general way by 133, from the minute spindle 1, so that the tongue will revolve and move the star wheel one tooth once in twenty-four hours. The minute spindle being driven from any desired clock mechanism, the star wheel will make a complete revolution every week. The shaft 126 carries a suitable number of pins or stops 134 which are spaced both longitudinally and circumferentially of the tube. The longitudinal spacing may be of any desired degree and will depend upon the length of the impression it is desired to take, so as to allow the card on successive days to be inserted further into the holder in order to properly space the data printed on the successive days. These pins form what may be termed banking pins for each day in the week and must be just long enough to intercept the card in the guide, and not so long as to catch on the sides of the slot in the center of the guide. The circumferential spacing of the slots is preferably such that one is in line with each of six teeth of the star wheel. It will be understood that as the star wheel is rotated the stop in position in the slot of the card guide to intercept a card is moved out of the way and the next succeeding one along the tube is brought into position. As shown in Fig. 2, the stud at the inner end of the shaft is in position to intercept a card inserted into the holder and upon the next revolution of the tongue this stop will be moved out of the way and the next succeeding one inserted. The parts have been broken away in Fig. 2 for convenience in illustrating, so that only the first two stops are shown, but it will be obvious that any desired number may be placed upon the shaft and that the spacing either longitudinal or circumferential of said stops may be made such as to give any desired arrangement of data upon the card. A flange 135 is preferably used instead of the last pin or stop, which flange at all times closes the end of the card guide. The rotatable shaft must of course stop short of the platen 102, but it can be arranged to extend backward any suitable distance inasmuch as it is supported on the bracket instead of on the frame itself.

The operation of the various parts of this machine will in general be understood from the description already given. They may be followed by summarizing the cycle of operations when it is desired to take an impression therefrom. Let it be supposed that it is desired to print both upon the web which is in the center of the machine and inaccessible to the operator, so that it may be preserved as a duplicate record for the benefit of the employer, and upon the workman's card. The workman upon beginning any particular job will turn the type recording-wheels to fit his number and the number of the job and will then insert the card, ticket or blank with which he is provided, into the upper mouth 99 of the card-holder. The card will be guided thereby into the channel of the card-holder and somewhat to one side thereof, so that the impression will be taken along a line of the card above the longitudinal center thereof. He will then press down upon the operating lever 106, only a single motion of such lever being necessary, when the card may be withdrawn with the proper details printed thereon. The action of the operating lever is first—to press down upon the plunger 50 and carry such plunger against the force of its spring so that its wedge will contact with the notches in the two sets of type-recording-wheels below it, complete the alinement of such wheels if the alinement previously made by the workman through the handles and the indexes is in the slightest degree faulty, and thereafter hold said type-recording-wheels fixed during the printing operation in order not to blur the impression; at the same time the rod 82 is pressed down and the ribbon is fed by means of the pawl 81 which rotates the ratchet 80. In this way the pressure upon the plunger and ribbon rod is equal and we have absolute control of the two pressures. The tension of the spring 105 is greater than that of the springs 52 and of the spring-rod 80 so that this preliminary movement of the alining detent and of the ribbon feed is made without affecting the platen. During this movement the lever pivots about the pin which connects it to the lever 110 and the detent plunger and the ribbon actuating rod form the resistance against which it acts. When the detent plunger has been seated in the notches of the type-wheels and the ribbon actuating rod has been pressed down to its fullest extent the order of the lever is then changed, its fulcrum shifts to the center and it then pivots about the two points which before constituted the resistance, and raises the rod 110 and the platen against the force of the spring 105, as shown in Fig. 5, thereby bringing the web and the card up against the type-wheels and taking the impression therefrom. Upon releasing the lever the springs restore all parts to their original position and the card may be withdrawn. The web of paper is fed at the same time the ribbon is actuated through the described connections. Upon finishing the work upon a given job the workman inserts his card in the lower mouth 100 of the card-holder and the card is then guided thereby so that the impression is made thereon upon a line immediately below the impression which was made upon beginning the job.

The operation of the means for determining the distance to which a card can be inserted into the holder, and the consequent spacing of the impressions longitudinally of the card, will be sufficiently clear from the description already given.

Having described our invention, what we claim as new and desire to secure by Letters Patent, is:—

1. In a device of the class described, in combination, a suitably driven minute-spindle 1, minute and hour hands controlled thereby, a type-wheel 20 driven therefrom, and an indicator hand 31 adapted to follow the movements of said type-wheel and connected thereto by means of an arched coupling 32 connected at one side to the indicator and at the other side to said type-wheel, substantially as and for the purpose set forth.

2. The combination with the printing mechanism, of an operating lever having a shifting fulcrum whereby it may be rocked first on one fulcrum and then on the other.

3. In a device of the class described, in combination with the rotary printing wheels and the aligning means therefor, a movable platen normally spring-held away from said wheels, the spring-held ribbon actuating rod and detent plunger, said spring being of less tension than the spring controlling said movable platen, and an actuating lever having a bearing upon the ends of said ribbon actuating rod and detent plunger and pivotally connected at one end thereof to a rod connected with the platen, substantially as and for the purposes set forth.

4. In combination with the printing wheels and the movable spring-held platen, an operating lever connected to said platen and having a yielding fulcrum supported by a spring of less tension than the spring controlling said platen.

5. In combination, the printing mechanism, a card holder therefor, and means for regulating the position which a card may be given in said holder with reference to the printing mechanism such that the impressions on the card may be spaced by such means in successive longitudinal and transverse columns.

6. In combination, the printing mechanism, a card holder therefor, a plurality of stops by which the distance to which a card may be inserted into said holder can be determined, and means for automatically changing the position of said stops, whereby they are successively brought into position longitudinally of the holder.

7. In combination, the printing mechanism, a card holder therefor, and stops adapted to be interposed in the path of a card as it is inserted in said holder at various points longitudinally thereof such that the distance to which the card may be inserted may be determined thereby.

8. In combination, the printing mechanism, a card holder therefor, stops adapted to be interposed in the path of a card as it is inserted in said holder at various points longitudinally thereof such that the distance to which the card may be inserted may be determined thereby, and means for automatically bringing said stops in position at predetermined intervals.

9. In a device of the class described, in combination, a printing mechanism and a card holder in operative relation thereto, said holder being provided with a single channel for guiding and holding a card and with a plurality of mouths leading to said channel, and a plurality of stops adapted to be successively introduced into said channel at various points longitudinally thereof whereby the distance to which a card may be inserted into the channel may be regulated.

10. In a device of the class described, in combination, a printing mechanism and a card holder in operative relation thereto, said holder being provided with a single channel for guiding and holding a card and with a plurality of mouths leading to said channel, and a plurality of stops adapted to be successively and automatically introduced into said channel at various points longitudinally thereof whereby the distance to which a card may be inserted into the channel may be automatically varied.

11. In a device of the class described, in combination with the printing mechanism and the card holder in operative relation thereto, a plurality of stops adapted to be inserted in said holder at various points longitudinally thereof, and means whereby said stops may be successively and automatically brought into position at predetermined intervals.

12. In a device of the class described, in combination with the printing mechanism and a card holder in operative relation thereto, a plurality of stops adapted to be successively inserted into said holder at various points longitudinally thereof, and means for automatically controlling the insertion of said stops.

13. In a device of the class described, in combination with the printing mechanism and the card holder in operative relation thereto, a member adapted to be rotated in proximity to said holder, a plurality of pins carried by said rotary member and spaced longitudinally and circumferentially thereof, which pins are adapted upon the rotation of said member to be successively brought into position to limit the distance to which a card can be inserted into said holder.

14. In a device of the class described, in combination with the printing mechanism adapted to be controlled by suitable clock mechanism, the card holder in operative relation to said printing mechanism, the rotary member adjacent said card holder, the spaced stops carried by said rotary member adapted to be successively brought into position upon rotation of said member to limit the distance to which a card may be inserted into said holder, and means for controlling the rotation of said rotary member from the clock mechanism.

15. In a device of the class described, in combination, a suitably driven minute spindle, a printing mechanism controlled thereby, a card holder in operative relation to said printing mechanism, a rotary member adjacent said card holder and carrying a plurality of spaced stops adapted to be successively brought into position to limit the distance to which a card can be inserted into said holder, and means for rotating said member from the minute spindle.

16. In a device of the class described, in combination, a suitably driven minute spindle, a printing mechanism controlled thereby, a card holder in operative relation to said printing mechanism, a rotary member adjacent said card holder and carrying a plurality of spaced stops adapted to be successively brought into position to limit the distance to which a card can be inserted into said holder, and a connection between said minute spindle and said rotary member whereby the rotation of said member may be automatically timed.

17. In a device of the class described, in combination, a suitably driven minute spindle, a printing mechanism controlled thereby, a card holder in operative relation to said printing mechanism, a shaft 126 adapted to be rotated adjacent said card holder, a plurality of spaced stops 134 carried by said shaft, adapted to be successively brought into position in the path of a card in said holder, and means controlled from said minute spindle whereby said shaft may be given a rotary movement at predetermined intervals.

18. In a workmen's time recorder, the combination with a clock-work, of time-printing means and an operative connection between said clock-work and said time-printing means, means for supporting a time sheet in position to receive an impression from said printing means, and means for allowing a time-card to be fed to a position between the time-printing means and the time sheet supporting means to receive an impression from the printing means.

19. A time recorder comprising time printing members, a clock mechanism to move said members, a support for a record strip, a platen for making impressions on said strip or on an inserted card, and a chute through which said card may be inserted between the printing members and the strip support so that an impression may be made only on the card.

20. In a time recorder, in combination, printing mechanism, means within said time recorder adapted to hold a record sheet opposite said printing mechanism, a card holder adapted to receive a record card and position the same opposite said printing mechanism, and means adapted to throw either said record sheet alone or a record card and sheet simultaneously into operative relation to said printing mechanism.

21. In a time recorder, in combination, printing mechanism, means within said time recorder adapted to hold a record sheet opposite said printing mechanism, a card holder adapted to receive a record card and position the same opposite said printing mechanism, means adapted to throw either said record sheet alone or a record card and sheet simultaneously into operative relation to said printing mechanism, and means adapted automatically to feed said record sheet to space the records impressed thereon.

22. In a time recorder, in combination, printing mechanism, ink ribbon feeding mechanism, and an operating lever having a plurality of fulcrums upon which it may be rocked successively to operate said mechanisms one after the other.

23. In a time recorder, in combination, printing mechanism including a plurality of type-wheels, means for alining said wheels, ink ribbon feeding mechanism, a platen, an operating lever having a plurality of fulcrums, and means for actuating said lever on said fulcrums to actuate said alining mechanism and ribbon feeding mechanisms simultaneously and the platen subsequent thereto.

24. In a time recorder, printing mechanism, a card guide or receiver, a plurality of rotatable stops, and means to rotate said stops to progressively and successively project the same into the guide or receiver to limit the movement of a card therein.

25. In a time recorder, printing mechanism, a card guide or receiver, a plurality of stops located exterior thereto, and means to progressively and successively project said stops into the receiver to limit the movement of a card when the latter is inserted in the receiver.

26. In a card time-recorder, the combination of a time-controlled stamp, a card-receiver held in operative relation to said stamp, and a plurality of abutments for limiting the extent to which the card is to be inserted in said card-receiver and against one of which the card strikes, said abutments serving to position the card to bring different portions in the length thereof in line with the printing point.

27. In a card time-recorder, the combination of a time-controlled stamp, a card-receiver held in operative relation to said stamp and having two offset diverging card-ways leading to a single card-way, and abutments serving to limit the inward movement of a time-card inserted in the card-receiver, said abutments being located at different points with relation to the printing point.

28. The combination with recording means, of a card-guide, a set of card-stops movable separately into the path of a card in the card-guide, and automatic means for shifting said stops.

29. In a time recorder, the combination with a time stamp, of a card receiver or guide, a series of stops to successively co-operate with a card inserted therein and thereby vary the position of such card with relation to the time stamp, and means to move one stop after another into operative position at predetermined intervals of time.

30. The combination with a time stamp, of an upright card receiver or guide, means to gradually decrease the effective depth thereof, said means including a plurality of members adapted to move one by one into and form a temporary bottom for the card receiver, and mechanism to render said members operative in succession at predetermined intervals of time.

31. The combination, with a time stamp, of a receiver or guide adjacent thereto and into which a card is inserted to be stamped, a series of stops located in equi-distant parallel planes at right angles to the receiver and individually movable thereinto to determine the extent to which a card may be inserted, and automatic means to move the stops one by one in regular sequence into the receiver at predetermined intervals of time.

32. The combination, with a time stamp, of a receiver or guide adjacent thereto and into which a card is inserted to be stamped, said receiver having a longitudinal opening in one of its walls, a rotatable carrier adjacent and parallel to such opening, a series of stops mounted thereon in parallelism and adapted to enter the opening one after another and limit the extent to which a card can be inserted in the receiver, and means to intermittingly rotate the carrier at predetermined intervals of time.

33. In a time recorder, the combination with a time stamp, and a card receiver or guide, a plurality of stops to successively contact with a card inserted therein to vary the position of the card relative to the time stamp, and means for operating said stops.

In testimony whereof we affix our signatures, in the presence of two witnesses.

JOHN DEY.
ALEXANDER DEY.

Witnesses to the signature of John Dey:
MINNIE E. PADDOCK,
JOHN F. HAYDEN.

Witnesses to the signature of Alexander Dey:
WILLIAM WILSON,
DANIEL F. RUSSELL.